US012696009B2

(12) United States Patent
Kobayashi et al.

(10) Patent No.: US 12,696,009 B2
(45) Date of Patent: Jul. 28, 2026

(54) PHOTOELECTRIC CONVERSION APPARATUS, ELECTRONIC EQUIPMENT, AND SUBSTRATE WITH DIFFERENTIAL CIRCUIT

(71) Applicant: CANON KABUSHIKI KAISHA, Tokyo (JP)

(72) Inventors: Hideo Kobayashi, Tokyo (JP); Masaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/673,482

(22) Filed: May 24, 2024

(65) Prior Publication Data

US 2024/0406601 A1 Dec. 5, 2024

(30) Foreign Application Priority Data

May 29, 2023 (JP) ................................. 2023-088073

(51) Int. Cl.
*H04N 25/772* (2023.01)
*H04N 25/79* (2023.01)

(52) U.S. Cl.
CPC ........... *H04N 25/772* (2023.01); *H04N 25/79* (2023.01)

(58) Field of Classification Search
CPC ...... H04N 25/772; H04N 25/79; H04N 25/78; H04N 25/70
See application file for complete search history.

(56) References Cited

U.S. PATENT DOCUMENTS

| | | | |
|---|---|---|---|
| 7,990,440 | B2 | 8/2011 | Kobayashi |
| 9,407,847 | B2 | 8/2016 | Maehashi |
| 9,438,828 | B2 | 9/2016 | Itano |
| 9,509,931 | B2 | 11/2016 | Kobayashi |
| 9,602,752 | B2 | 3/2017 | Kobayashi |
| 10,015,430 | B2 | 7/2018 | Kobayashi |
| 10,609,316 | B2 | 3/2020 | Kobayashi |
| 11,268,851 | B2 | 3/2022 | Kobayashi |
| 11,323,648 | B2 | 5/2022 | Matsuura |
| 11,431,929 | B2 | 8/2022 | Kobayashi |
| 11,463,644 | B2 | 10/2022 | Soda |
| 11,470,275 | B2 | 10/2022 | Kobayashi |
| 11,477,401 | B2 | 10/2022 | Itano |
| 11,496,704 | B2 | 11/2022 | Sato |
| 11,616,925 | B2 | 3/2023 | Kobayashi |
| 11,653,114 | B2 | 5/2023 | Nakazawa |

(Continued)

FOREIGN PATENT DOCUMENTS

| | | |
|---|---|---|
| JP | 2020-191543 A | 11/2020 |
| JP | 2021-034786 A | 3/2021 |

(Continued)

*Primary Examiner* — Gevell V Selby
(74) *Attorney, Agent, or Firm* — Venable LLP

(57) ABSTRACT

A photoelectric conversion apparatus is provided. The photoelectric conversion apparatus includes: a photoelectric conversion unit configured to receive incident light; a differential circuit configured to receive a first signal and a second signal, which are signals respectively corresponding to signal charges generated by the photoelectric conversion unit based on the incident light, and output a third signal indicating a difference between the first signal and the second signal; and an oversampling conversion circuit configured to perform analog-digital conversion of the third signal.

20 Claims, 7 Drawing Sheets

(56) References Cited

U.S. PATENT DOCUMENTS

| | | | |
|---|---|---|---|
| 11,688,755 | B2 | 6/2023 | Kobayashi |
| 11,736,813 | B2 | 8/2023 | Kobayashi |
| 11,800,253 | B2 | 10/2023 | Saito |
| 11,843,880 | B2 | 12/2023 | Kobayashi |
| 11,843,893 | B2 | 12/2023 | Kobayashi |
| 11,910,116 | B2 | 2/2024 | Kobayashi |
| 11,962,920 | B2 | 4/2024 | Muraoka |
| 2020/0265909 | A1 | 8/2020 | Matsuura |
| 2022/0247943 | A1* | 8/2022 | Zhan ..................... H04N 25/20 |
| 2022/0303484 | A1* | 9/2022 | Kobayashi ............ H04N 25/78 |
| 2022/0303485 | A1* | 9/2022 | Kobayashi .......... H04N 25/618 |
| 2022/0303486 | A1 | 9/2022 | Kobayashi |
| 2022/0353441 | A1 | 11/2022 | Muraoka |
| 2023/0041974 | A1 | 2/2023 | Kobayashi |
| 2023/0070568 | A1 | 3/2023 | Kobayashi |
| 2023/0072715 | A1 | 3/2023 | Kobayashi |
| 2023/0117988 | A1 | 4/2023 | Kobayashi |
| 2023/0154963 | A1 | 5/2023 | Kobayashi |
| 2023/0171514 | A1 | 6/2023 | Kobayashi |
| 2023/0178580 | A1 | 6/2023 | Yamazaki |
| 2023/0179890 | A1 | 6/2023 | Kobayashi |
| 2023/0209216 | A1* | 6/2023 | Zhan ................... H04N 25/771 |
| | | | 348/301 |
| 2023/0216459 | A1 | 7/2023 | Kobayashi |
| 2023/0247332 | A1 | 8/2023 | Kobayashi |
| 2023/0276147 | A1 | 8/2023 | Arishima |
| 2023/0282654 | A1 | 9/2023 | Kobayashi |
| 2024/0022838 | A1 | 1/2024 | Muto |
| 2024/0040279 | A1 | 2/2024 | Arishima |
| 2024/0064439 | A1 | 2/2024 | Kobayashi |
| 2024/0080590 | A1 | 3/2024 | Shimada |
| 2024/0080591 | A1 | 3/2024 | Takahashi |
| 2024/0147096 | A1 | 5/2024 | Kobayashi |
| 2024/0214704 | A1 | 6/2024 | Kobayashi |
| 2024/0284076 | A1 | 8/2024 | Kobayashi |

FOREIGN PATENT DOCUMENTS

| | | |
|---|---|---|
| JP | 2022-144243 A | 10/2022 |
| WO | 2019/069614 A1 | 4/2019 |

* cited by examiner

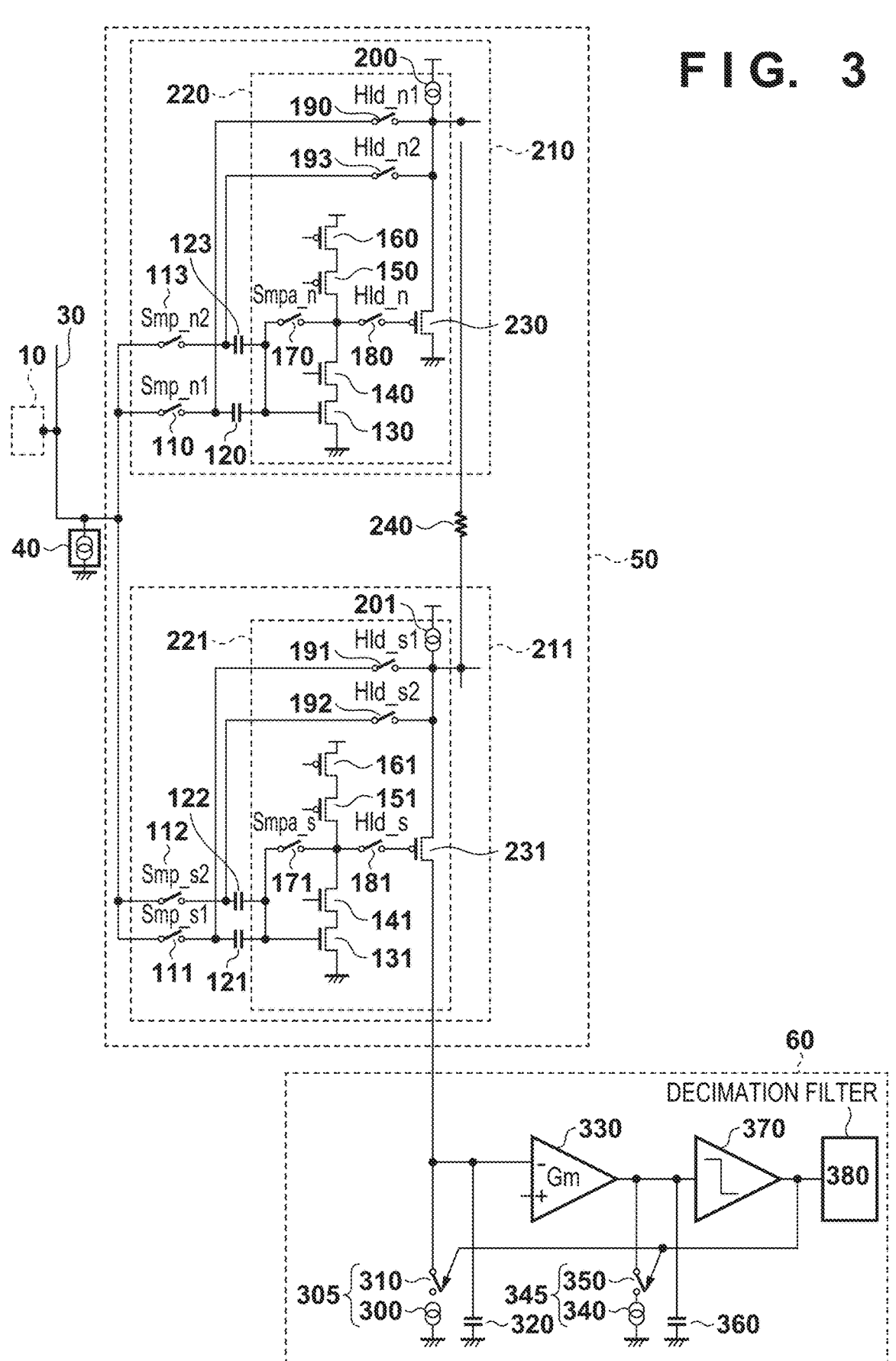
F I G.  3

F I G. 5
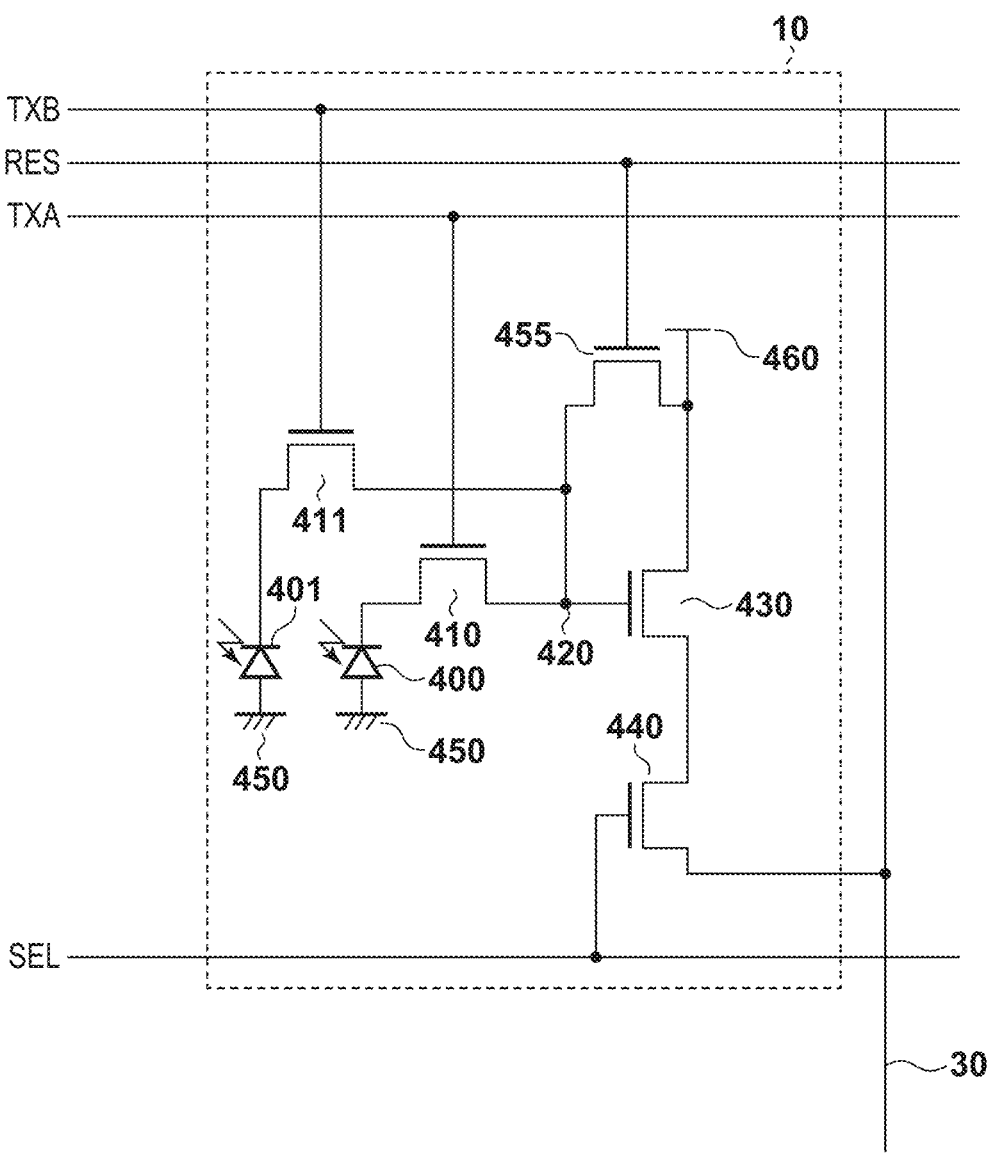

F I G.   7
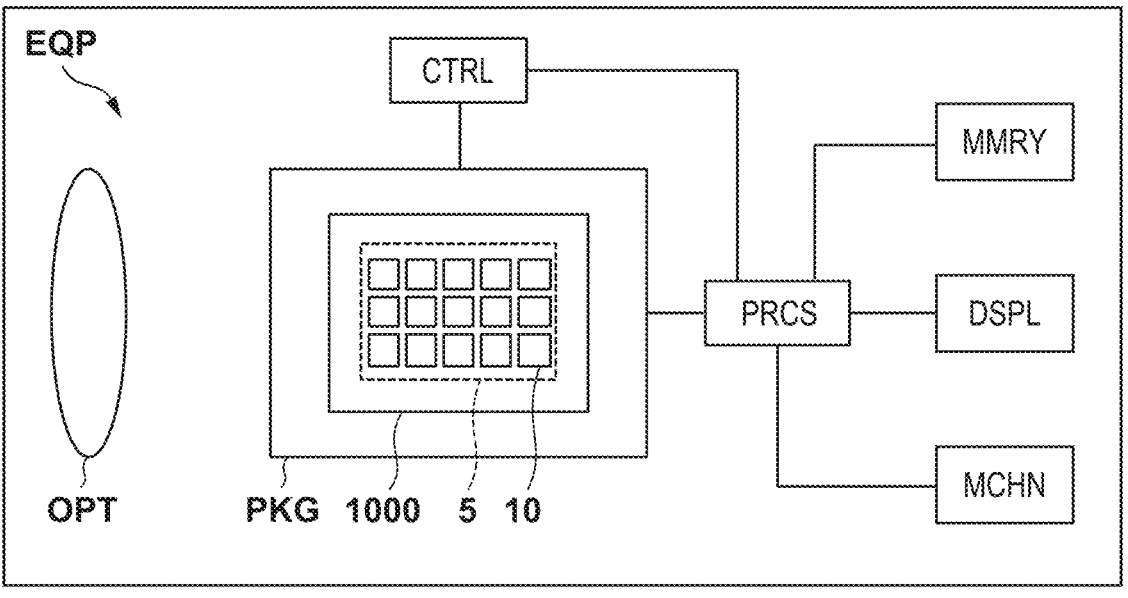

PHOTOELECTRIC CONVERSION APPARATUS, ELECTRONIC EQUIPMENT, AND SUBSTRATE WITH DIFFERENTIAL CIRCUIT

BACKGROUND OF THE INVENTION

Field of the Invention

The present invention relates to a photoelectric conversion apparatus, electronic equipment, and a substrate.

Description of the Related Art

International Publication No. 2019/069614 describes a solid-state image capturing apparatus including a $\Delta\Sigma$ analog-digital conversion circuit. In the solid-state image capturing apparatus described in International Publication No. 2019/069614, differential processing between a data signal sampled by a data signal sample hold circuit and a reset signal sampled by a reset signal sample hold circuit is performed.

SUMMARY OF THE INVENTION

Some embodiments of the present invention provide a technique advantageous in improving the usability of a photoelectric conversion apparatus.

According to some embodiments, a photoelectric conversion apparatus comprising: a photoelectric conversion unit configured to receive incident light; a differential circuit configured to receive a first signal and a second signal, which are signals respectively corresponding to signal charges generated by the photoelectric conversion unit based on the incident light, and output a third signal indicating a difference between the first signal and the second signal; and an oversampling conversion circuit configured to perform analog-digital conversion of the third signal, is provided.

According to some other embodiments, a substrate stacked on a substrate provided with a photoelectric conversion unit configured to receive incident light, the substrate comprising: a differential circuit configured to receive a first signal and a second signal, which are signals respectively corresponding to signal charges generated by the photoelectric conversion unit based on the incident light, and output a third signal indicating a difference between the first signal and the second signal; and an oversampling conversion circuit configured to perform analog-digital conversion of the third signal, is provided.

Further features of the present invention will become apparent from the following description of exemplary embodiments (with reference to the attached drawings).

BRIEF DESCRIPTION OF THE DRAWINGS

FIG. 3 is a view showing an arrangement example of a sample hold unit and a conversion circuit of the photoelectric conversion apparatus shown in FIG. 1;

FIG. 5 is a view showing an arrangement example of the pixel of the photoelectric conversion apparatus shown in FIG. 1;

FIG. 7 is a view showing an arrangement example of a camera incorporating the photoelectric conversion apparatus according to the embodiment.

DESCRIPTION OF THE EMBODIMENTS

Figure 1:
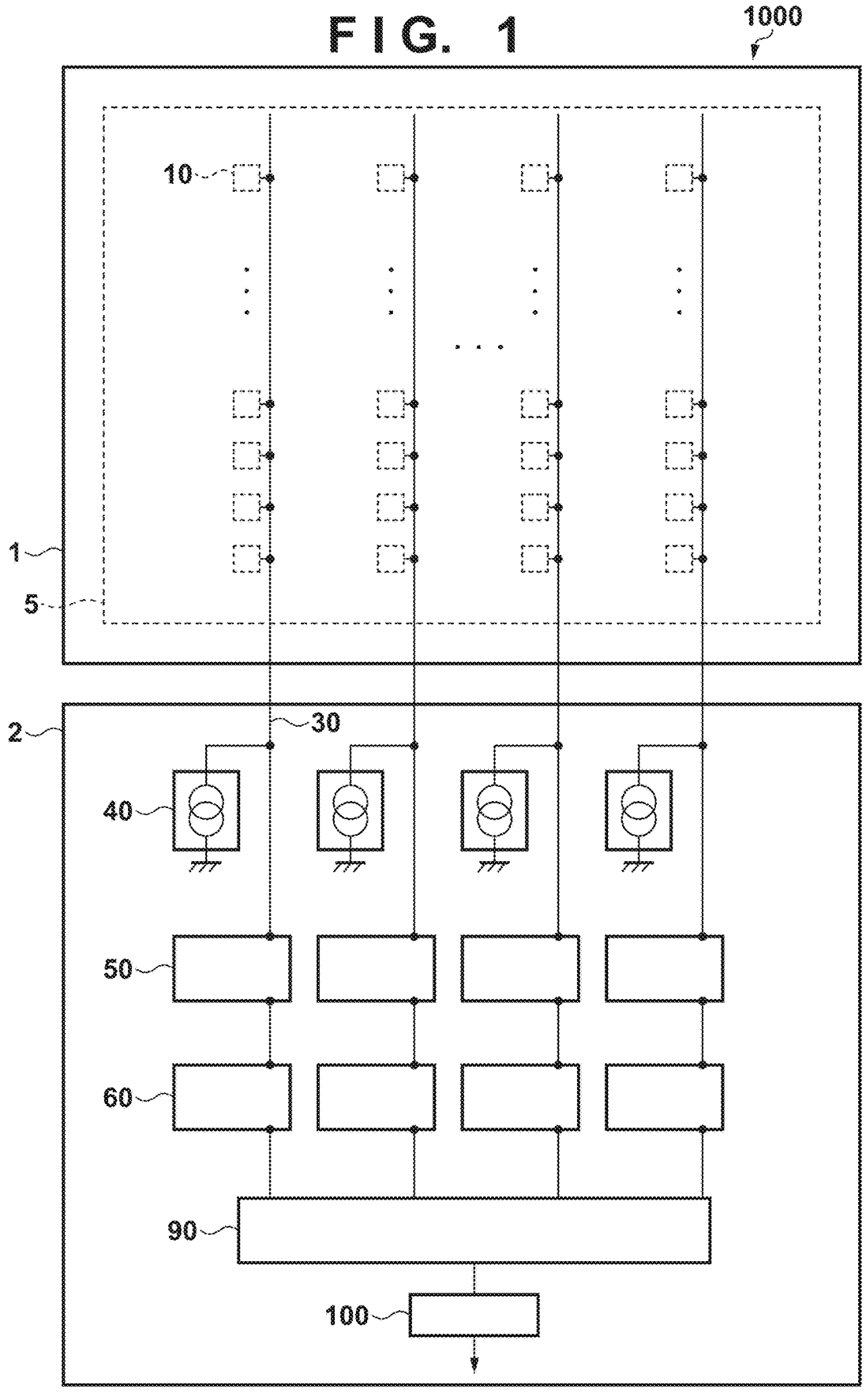
FIG. 1 is a view showing an arrangement example of a photoelectric conversion apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 2:
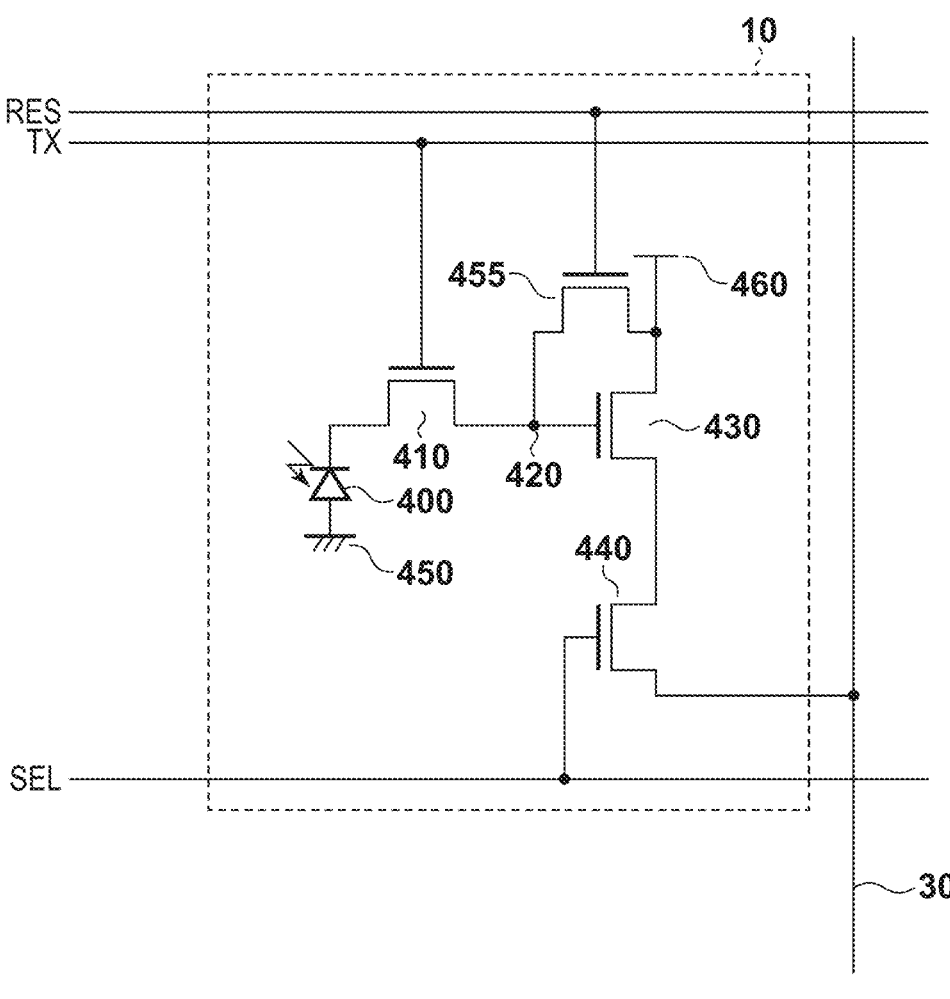
FIG. 2 is a view showing an arrangement example of a pixel of the photoelectric conversion apparatus shown in FIG. 1.
Figure 4:
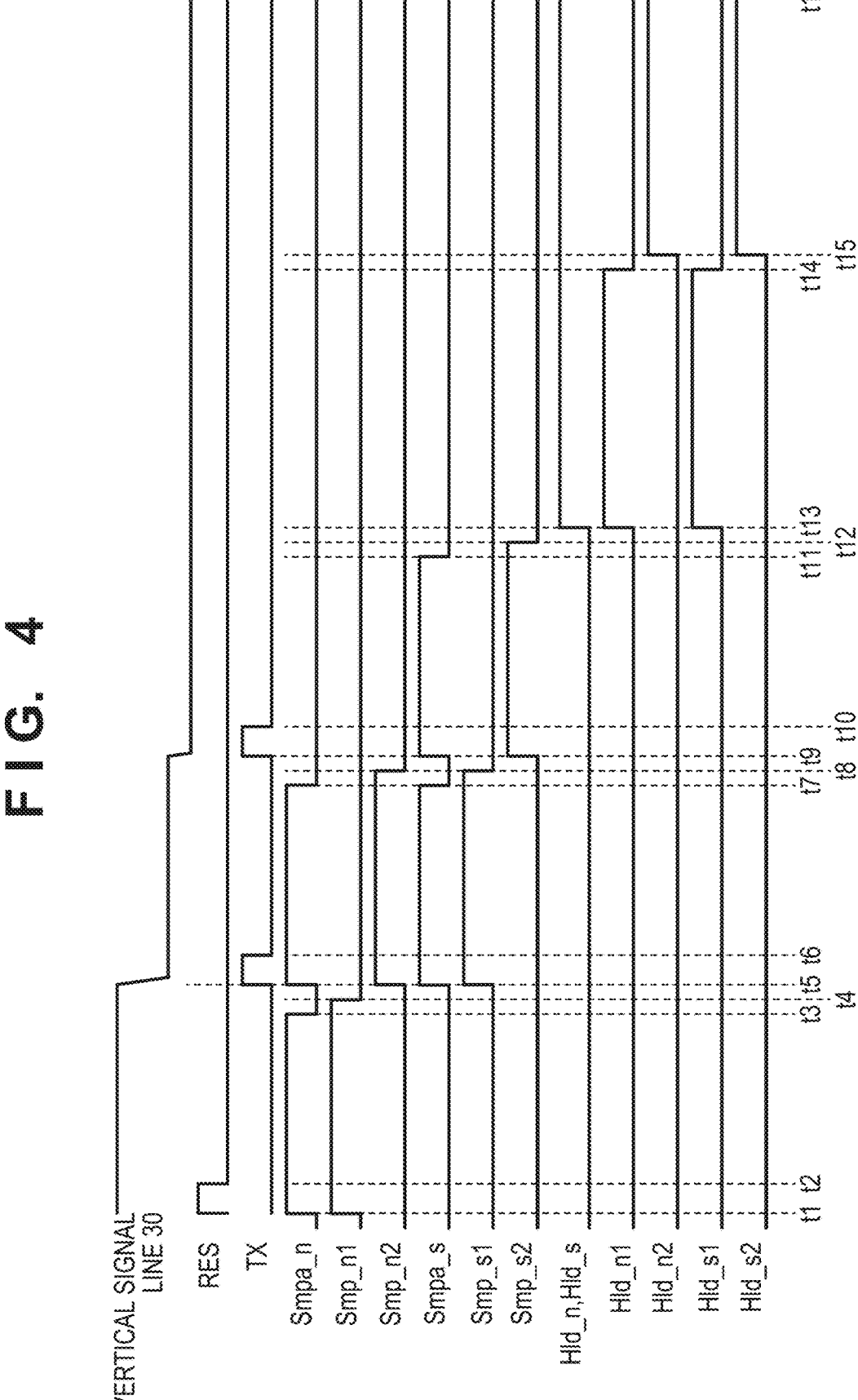
FIG. 4 is a timing chart showing an operation example of the photoelectric conversion apparatus shown in FIG. 1.

With reference to FIGS. 1 to 6, a photoelectric conversion apparatus according to an embodiment of the present disclosure will be described. FIG. 1 is a schematic view showing an arrangement example of a photoelectric conversion apparatus 1000 according to the present disclosure. FIG. 2 is a view showing an arrangement example of a pixel 10 arranged in the photoelectric conversion apparatus 1000. FIG. 3 is a view showing an arrangement example of a sample hold unit 50 and a conversion circuit 60 configured to perform analog-digital conversion, which are arranged in the photoelectric conversion apparatus 1000. FIG. 4 is a timing chart showing an operation example of the photoelectric conversion apparatus 1000.

The photoelectric conversion apparatus 1000 includes a pixel substrate 1, which is a substrate on which a plurality of pixels 10 (photoelectric conversion elements 400) are arranged, and a circuit substrate 2, which is a substrate on which a circuit for operating the pixel 10 and the like are arranged. The photoelectric conversion apparatus 1000 may have a stacked chip structure in which the pixel substrate 1 and the circuit substrate 2 are stacked on each other. The pixel substrate 1 includes a photoelectric conversion unit 5 in which the plurality of pixels 10 (photoelectric conversion elements 400) are arranged. The circuit substrate 2 is formed by including current sources 40, the sample hold units 50, the conversion circuits 60, a data processing circuit 90, and an output unit 100.

In the photoelectric conversion unit 5 which receives incident light, the plurality of pixels 10 each including the photoelectric conversion element 400 are arranged in a matrix. Here, a row direction indicates a horizontal direction in FIG. 1, and a column direction indicates a vertical direction in FIG. 1. The pixel 10 generates charges corresponding to the incident light.

In the photoelectric conversion unit 5, a vertical signal line 30 is arranged along the column direction in correspondence with each pixel column where the pixels 10 are arranged. The vertical signal line 30 transfers, from the pixel 10 to the sample hold unit 50, a signal based on the charges generated by the photoelectric conversion element 400 arranged in the pixel 10.

The current source 40 is arranged in correspondence with each vertical signal line 30. The current source 40 supplies, to the pixel 10 selected to read out the signal, a bias current for reading out the signal via the vertical signal line 30.

The sample hold unit 50 samples and holds the signal, which is generated by the photoelectric conversion element 400 arranged in each pixel 10, from the photoelectric conversion unit 5 via the vertical signal line 30. In this embodiment, in the sample hold unit 50, two sample hold circuits are connected to one vertical signal line 30. This will be described in detail later.

The conversion circuit 60 performs analog-digital conversion of a signal output from the sample hold unit 50. The conversion circuit 60 is arranged in correspondence with each vertical signal line 30. As the conversion circuit 60 which performs analog-digital conversion, an oversampling analog-digital converter such as a delta-sigma (42) analog-digital conversion circuit can be used. However, the present invention is not limited to this, and a slope analog-digital conversion circuit, a successive approximation type analog-digital conversion circuit, or the like may be used as the conversion circuit 60.

The data processing circuit 90 is a digital signal processing circuit that processes a digital signal output from the conversion circuit 60. For example, the data processing circuit 90 may perform correction processing, interpolation processing, or the like on the digital signal output from the conversion circuit 60. The output circuit 100 outputs the signal processed by the data processing circuit 90 to the outside of the photoelectric conversion apparatus 1000.

As shown in FIG. 2, the pixel 10 can include the photoelectric conversion element 400, a transfer transistor 410, a reset transistor 455, an amplification transistor 430, and a selection transistor 440. The photoelectric conversion element 400 can be, for example, a photodiode. One of two main electrodes of the photoelectric conversion element 400 is connected to a ground potential 450. The photoelectric conversion element 400 photoelectrically converts received light into signal charges (for example, photoelectrons) of the charge amount corresponding to the amount of the received light, and accumulates the signal charges. The other of two main electrodes of the photoelectric conversion element 400 is connected to the gate electrode of the amplification transistor 430 via the transfer transistor 410. A node 420 electrically connected to the gate electrode of the amplification transistor 430 functions as a floating diffusion. The floating diffusion is a charge-voltage conversion unit that converts the signal charges generated by the photoelectric conversion element 400 into a signal voltage. Here, the plurality of pixels 10 are arranged in the photoelectric conversion unit 5. Therefore, it can also be said that a plurality of photoelectric conversion elements 400 and a plurality of floating diffusions respectively corresponding to the plurality of photoelectric conversion elements 400 are arranged in the photoelectric conversion unit 5.

A control signal TX is supplied to the gate electrode of the transfer transistor 410. When the transfer transistor 410 set in a conductive state (ON state) in accordance with the control signal TX, the signal charges photoelectrically converted by the photoelectric conversion element 400 and accumulated in the photoelectric conversion element 400 are transferred to the node 420 serving as the floating diffusion.

The reset transistor 455 is connected between a power supply potential 460 and the node 420. The expression here that "a transistor is connected between A and B" represents a state in which one of two main electrodes (source and drain) of the transistor is connected to A and the other of two main electrodes is connected to B. In this case, the gate electrode of the transistor is not connected to neither A nor B.

A control signal RES is supplied to the gate electrode of the reset transistor 455. When the reset transistor 455 is set in an ON state in accordance with the control signal RES, the potential of the node 420 serving as the floating diffusion is reset to the power supply potential 460, and the charges held by the floating diffusion are swept out.

The amplification transistor 430 is connected between the power supply potential 460 and the selection transistor 440. The gate electrode of the amplification transistor 430 is connected to the node 420. The amplification transistor 430 forms the input section of a source follower that reads out the signal obtained from the photoelectric conversion by the photoelectric conversion element 400. That is, one of two main electrodes of the amplification transistor 430 is connected to the vertical signal line 30 via the selection transistor 440. The amplification transistor 430 and the above-described current source 40 connected to the vertical signal line 30 form a source follower that converts the voltage of the node 420 into the potential of the vertical signal line 30.

The selection transistor 440 is connected between the amplification transistor 430 and the vertical signal line 30. A control signal SEL is supplied to the gate electrode of the selection transistor 440. When the selection transistor 440 is set in an ON state in accordance with the control signal SEL, the pixel 10 is set in a selected state, and the signal is output from the amplification transistor 430 to the vertical signal line 30.

The circuit arrangement of the pixel 10 is not limited to the arrangement shown in FIG. 2. For example, the selection transistor 440 may be connected between the power supply potential 460 and the amplification transistor 430. The arrangement shown in FIG. 2 shows, as the pixel 10, a so-called four-transistor arrangement including the transfer transistor 410, the reset transistor 455, the amplification transistor 430, and the selection transistor 440. However, the pixel 10 is not limited to this. For example, the selection transistor 440 may be omitted from the pixel 10, and the pixel 10 may have a three-transistor arrangement in which the amplification transistor 430 also functions as the selection transistor. Alternatively, the pixel 10 may have an arrangement with an increased number of transistors such as an arrangement including five transistors or more. The pixel 10 can output a reset signal obtained when the potential of the node 420 is reset by the reset transistor 455 to reset the photoelectric conversion element 400, and a data signal at the signal level obtained when the photoelectric conversion element 400 performs photoelectric conversion in accordance with the incident light.

FIG. 3 shows an example of the circuit arrangement while focusing on the sample hold unit 50 and the conversion circuit 60 of the photoelectric conversion apparatus 1000. Among the sample hold units 50 and the conversion circuits 60, FIG. 3 shows sample hold circuits and an analog-digital conversion circuit arranged in correspondence with one vertical signal line 30. As the sample hold unit 50, two sample hold circuits 210 and 211 for sampling and holding, for each pixel 10, the reset signal and data signal output from each pixel 10 are connected in correspondence with one vertical signal line 30. Further, one conversion circuit 60 is connected in correspondence with one vertical signal line 30.

The sample hold circuit 210 includes capacitive elements 120 and 123, and an inverting amplifier 220 serving as an output amplifier shared by the capacitive elements 120 and 123. Switches 110 and 113 control connection between the vertical signal line 30 and the capacitive elements 120 and 123 in accordance with control signals Smp_n1 and Smp_n2. The inverting amplifier 220 can be formed by a combination of a common source circuit and a source follower circuit. The inverting amplifier 220 includes transistors 130, 140, 150, 160, and 230, switches 170, 180, 190, and 193, and a current source 200. The switch 170 is connected between the input and output of the common source circuit formed by the transistors 130, 140, 150, and 160, and controlled by a control signal Smpa_n. The signal sampled by the sample hold circuit 210 is output from the inverting amplifier 220 in accordance with a control signal Hold_n, Hold_n1, or Hold_n2.

The sample hold circuit 211 can have an arrangement similar to the arrangement of the sample hold circuit 210. The sample hold circuit 211 includes capacitive elements 121 and 122, and an inverting amplifier 221 serving as an output amplifier shared by the capacitive elements 121 and 122. Switches 111 and 112 control connection between the vertical signal line 30 and the capacitive elements 121 and 122 in accordance with control signals Smp_s1 and Smp_s2. The inverting amplifier 221 can be formed by a combination of a common source circuit and a source follower circuit. The inverting amplifier 221 includes transistors 131, 141, 151, 161, and 231, switches 171, 181, 191, and 192, and a current source 201. The switch 171 is connected between the input and output of the common source circuit formed by the transistors 131, 141, 151, and 161, and controlled by a control signal Smpa_s. The signal sampled by the sample hold circuit 211 is output from the inverting amplifier 221 in accordance with a control signal Hold_s, Hold_s1, or Hold_s2.

As shown in FIG. 3, a resistor element 240 is arranged between the output terminal of the sample hold circuit 210 and the output terminal of the sample hold circuit 211. Here, let V1 be the potential at the output terminal of the sample hold circuit 210, that is, the potential corresponding to the signal sampled by the sample hold circuit 210. Similarly, let V2 be the potential at the output terminal of the sample hold circuit 211, that is, the potential corresponding to the signal sampled by the sample hold circuit 211. Further, let R be the resistance value of the resistor element 240. Since the resistor element 240 is arranged between the output terminal of the sample hold circuit 210 and the output terminal of the sample hold circuit 211, a current I flowing through the resistor element 240 is expressed by:

$$I = (V1 - V2)/R$$

The current I is input to the conversion circuit 60.

In this case, the current I flowing through the resistor element 240 is proportional to the difference between the potential V1 at the output terminal of the sample hold circuit 210 and the potential V2 at the output terminal of the sample hold circuit 211. Therefore, it can also be said that the resistor element 240 generates, as a signal to be supplied to the conversion circuit 60, a current corresponding to the signal voltage difference between the signal held by the sample hold circuit 210 and the signal held by the sample hold circuit 211. Accordingly, the resistor element 240 functions as a differential circuit for outputting a signal indicating the difference between the signal held by the sample hold circuit 210 and the signal held by the sample hold circuit 211 in the sample hold unit 50. For example, the above-described reset signal is sampled by the sample hold circuit 210, and the data signal is sampled by the sample hold circuit 211. As has been described above, since the current I flowing through the resistor element 240 is proportional to the difference between the potential V1 at the output terminal of the sample hold circuit 210 and the potential V2 at the output terminal of the sample hold circuit 211, correlated double sampling (CDS) is performed at the stage in which the current I is input to the conversion circuit 60. The conversion circuit 60 performs analog-digital conversion of the signal (current) indicating the difference between the signal held by the sample hold circuit 210 and the signal held by the sample hold circuit 211.

In this embodiment, the conversion circuit 60 as a 42 analog-digital conversion circuit includes a first integrator, a second integrator, a quantizer 370, and a decimation filter 380. In the conversion circuit 60, the first integrator is formed by an integral capacitor 320. The second integrator is formed by a Gm cell 330, which converts a voltage into a current, and an integral capacitor 360. A digital-analog converter 305 including a current source 300 and a switch 310 is connected the input node of the first integrator. In accordance with a digital signal via the second integrator and the quantizer 370, the digital-analog converter 305 controls the current to the first integrator. A digital-analog converter 345 including a current source 340 and a switch 350 is connected to the input node of the second integrator. As the output of the second integrator, the digital-analog converter 345 controls the current of the second integrator in accordance with the result of quantization by the quantizer 370.

In the conversion circuit 60, the quantizer 370 performs an operation of feeding back the preceding quantization value to the second integrator and the first integrator through the digital-analog converters 305 and 345. In this manner, by passing the preceding quantization value through the integrators twice while feeding it back to the digital-analog converters 305 and 345, a secondary noise shaping characteristic can be obtained. Furthermore, by removing high-frequency noise by the decimation filter 380 arranged at the succeeding stage of the quantizer 370, an analog-digital conversion output can be obtained with high accuracy.

FIG. 4 shows an operation example of respective switches of the sample hold circuits 210 and 211. FIG. 4 shows the waveform of each of the control signals RES and TX of the pixel 10, the potential of the vertical signal line 30, and the control signals Smp_n1, Smp_n2, Smpa_n, Hld_n, Hld_n1, Hld_n2, Smp_s1, Smp_s2, Smpa_s, Hld_s, Hld_s1, and Hld_s2 of respective switches of the sample hold circuits 210 and 211. A description will be given assuming that, in the waveforms shown in FIG. 4, while the control signal is at high level, the corresponding switch is in the conductive state, and while the control signal is at low level, the corresponding switch is in the non-conductive state (OFF state). In FIG. 4, the operation of one pixel 10 (photoelectric conversion element 400) of interest will be described, but a similar operation can be performed in each pixel 10 (photoelectric conversion element 400) arranged in the photoelectric conversion unit 5. In that case, the operation illustrated in FIG. 4 can be simultaneously performed in the pixel 10 (photoelectric conversion element 400) arranged in the same row as the pixel 10 (photoelectric conversion element 400) of interest. Further, the similar operation can be sequentially performed for each row in the pixel 10 (photoelectric conversion element 400) arranged in the same column as the pixel 10 (photoelectric conversion element 400) of interest.

In the period from time t1 to time t2, the control signal RES shown in FIG. 2 is set at high level and the reset transistor 455 is turned on to reset the node 420 serving as the floating diffusion. In accordance with the reset of the node 420, the potential of the vertical signal line 30 is set at the level of the reset signal. In addition, at time t1, the control signals Smp_n1 and Smpa_n are set at high level, and the switches 110 and 170 are turned on in the sample hold circuit 210. Then, at time t3 when the control signal Smpa_n transitions from high level to low level, a potential Vn of the reset signal is sampled and accumulated in the capacitive element 120 of the sample hold circuit 210. Then, at time t4, the control signal Smp_n1 transitions from high level to low level, the switch 110 is turned off, and the capacitive element 120 is disconnected from the vertical signal line 30. Here, although not shown in FIG. 4, the following description will be given assuming that the photoelectric conversion element 400 is reset before time t1 and charges corresponding to incident light have been accumulated.

In the period from time t5 to time t6, the control signal TX shown in FIG. 2 is set at high level and the transfer transistor 410 is turned on, so that charges are transferred from the photoelectric conversion element 400 to the node 420 serving as the floating diffusion. The potential of the node 420 decreases in accordance with the amount of charges transferred from the photoelectric conversion element 400. Accordingly, the potential of the vertical signal line 30 decreases to the level of the first data signal. In addition, at time t5, the control signals Smp_s1 and Smpa_s are set at high level, and the switches 111 and 171 are turned on in the sample hold circuit 211. Then, at time t7 when the control signal Smpa_s transitions from high level to low level, a potential Vs1 of the first data signal is sampled and accumulated in the capacitive element 121. Then, at time t8, the control signal Smp_s1 transitions from high level to low level, the switch 111 is turned off, and the capacitive element 121 is disconnected from the vertical signal line 30.

Here, the voltage across the switch 171 upon turning off the switch 171 at time t7 is always approximately the same regardless of the potential of the vertical signal line 30. Therefore, it can be suppressed that a gain component error occurs in the potential Vs1 of the first data signal accumulated in the capacitive element 121 by charge injection caused by turning off the switch 171. Further, when turning off the switch 111 at time t8, since both ends of the capacitive element 121 are in a high impedance state, the influence of turning off the switch 111 is unlikely to occur. In this manner, the gain error in the potential Vs1 of the first data signal can be suppressed.

In the above-described operation, at time t5, the control signals Smp_n2 and Smpa_n are set at high level, and the switches 113 and 170 are turned on in the sample hold circuit 210. Then, at time t7 when the control signal Smpa_n transitions from high level to low level, the potential Vs1 of the first data signal is sampled and accumulated in the capacitive element 123. Then, at time t8, the control signal Smp_n2 transitions from high level to low level, the switch 113 is turned off, and the capacitive element 123 is disconnected from the vertical signal line 30. In this manner, in this embodiment, the potential Vs1 of the first data signal is also sampled in the capacitive element 123 in the sample hold circuit 210.

In the period from time t9 to time t10, the control signal TX shown in FIG. 2 is set at high level again, and the transfer transistor 410 is turned on. With this, the charges accumulated in the photoelectric conversion element 400 in the period from time t6 to time t10 are further transferred to the node 420 serving as the floating diffusion. The potential of the node 420 further decreases in accordance with the amount of the charges. Accordingly, the potential of the vertical signal line 30 further decreases to the level of the second data signal. In addition, at time t9, the control signals Smp_s2 and Smpa_s are set at high level, and the switches 112 and 171 are turned on in the sample hold circuit 211. Then, at time t11 when the control signal Smpa_s transitions from high level to low level, a potential Vs2 of the second data signal is sampled and accumulated in the capacitive element 122. Then, at time t12, the control signal Smp_s2 transitions from high level to low level, the switch 112 is turned off, and the capacitive element 122 is disconnected from the vertical signal line 30.

Here, the voltage across the switch 171 upon turning off the switch 171 at time t11 is always approximately the same regardless of the potential of the vertical signal line 30. Therefore, it can be suppressed that a gain component error occurs in the potential Vs2 of the second data signal accumulated in the capacitive element 122 by charge injection caused by turning off the switch 171. Further, when turning off the switch 112 at time t12, since both ends of the capacitive element 122 are in a high impedance state, the influence of turning off the switch 112 is unlikely to occur. In this manner, the gain error in the potential Vs2 of the second data signal can be suppressed.

In this manner, in the sample hold unit 50, after the first transfer operation of transferring charges from the photoelectric conversion element 400 to the node 420 serving as the floating diffusion and before performing the second transfer operation of transferring charges from the same photoelectric conversion element 400 to the node 420 without resetting the node 420 after the first transfer operation, the first data signal based on the charges transferred to the floating diffusion is sampled in the capacitive element 123 of the sample hold circuit 210 and the capacitive element 121 of the sample hold circuit 211. Further, in the sample hold unit 50, after the second transfer operation, the second data signal based on the charges transferred to the floating diffusion is sampled in the capacitive element 122 of the sample hold circuit 211. Furthermore, in the sample hold unit 50, as has been described above, when the node 420 functioning as the floating diffusion is reset, the reset signal corresponding to the voltage of the reset node 420 is sampled and held in the capacitive element 120 of the sample hold circuit 210.

Then, at time t13, the control signals Hld_n1 and Hld_n are set at high level, and the switches 180 and 190 are turned on. With this, in the sample hold circuit 210, the capacitive element 120 outputs the potential Vn of the reset signal. In addition, at the same time t13, the control signals Hld_s1 and Hld_s are set at high level, and the switches 181 and 191 are turned on. With this, in the sample hold circuit 211, the capacitive element 121 outputs the potential Vs1 of the first data signal.

As has been described above, a current corresponding to the difference between the potential Vn of the reset signal at the output terminal of the sample hold circuit 210 and the potential Vs1 of the first data signal at the output terminal of the sample hold circuit 211 is input to the conversion circuit 60. The conversion circuit 60 performs analog-digital conversion of the current corresponding to the difference between the potential Vn and the potential Vs1.

After the control signal Hld_n1 is set at low level and the switch 190 is turned off at time t14, the control signal Hld_n2 is set at high level and the switch 193 is turned on at time t15. With this, in the sample hold circuit 210, the capacitive element 123 outputs the potential Vs1 of the first data signal. In addition, after the control signal Hld_s1 is set at low level and the switch 191 is turned off at time t14, the control signal Hld_s2 is set at high level and the switch 192 is turned on at time t15. With this, in the sample hold circuit 211, the capacitive element 122 outputs the potential Vs2 of the second data signal.

With this, a current corresponding to the difference between the potential Vs1 of the first data signal at the output terminal of the sample hold circuit 210 and the potential Vs2 of the second data signal at the output terminal of the sample hold circuit 211 is input to the conversion circuit 60. The conversion circuit 60 performs analog-digital conversion of the current corresponding to the difference between the potential Vs1 and the potential Vs2.

In this embodiment, from the result of analog-digital conversion of the difference between the potential Vn of the reset signal and the potential Vs1 of the first data signal, a signal can be obtained which is based on the charges generated by the photoelectric conversion element 400 in accordance with incident light during the accumulation time starting before time t1 and ending at time t6. In addition, from the result of analog-digital conversion of the difference between the potential Vs2 of the second data signal and the potential Vs1 of the first data signal, a signal can be obtained which is based on the charges generated by the photoelectric conversion element 400 in accordance with incident light during the accumulation time from time t6 to time t10.

In this embodiment, it is possible to obtain not only a signal corresponding to the difference between the reset signal and the data signal but also a signal corresponding to the difference between the first data signal and the second data signal respectively based on the charges generated in accordance with incident light. In this manner, by acquiring the difference between the data signals and performing A/D conversion based on the difference between the data signals, for example, it is possible to read out two signals having different accumulation times as has been described above. The signals having different accumulation times may be used in, for example, high dynamic range (HDR) image capturing or the like, so that the functionality of the photoelectric conversion apparatus 1000 can be improved.

In addition, as has been described above, it is possible to suppress the gain errors of the potentials Vs1 and Vs2 of two data signals. Further, since the capacitive element 121 and the capacitive element 122 are arranged in one sample hold circuit 211 and share the inverting amplifier 221, it is possible to read out the potentials Vs1 and Vs2 of two data signals without increasing the operating power. Similarly, since the capacitive element 120 and the capacitive element 123 are arranged in one sample hold circuit 210 and share the inverting amplifier 220, it is possible to read out the potential Vn of the reset signal and the potential Vs1 of the first data signal without increasing the operating power. In addition, since the sample hold circuit 210 includes capacitive elements 120 and 123, it is possible to perform CDS with respect to both the potentials Vs1 and Vs2 of two data signals sampled in two capacitive elements 121 and 122.

Furthermore, by performing analog-digital conversion of the difference signal between the potential Vs2 of the second data signal and the potential Vs1 of the first data signal, noise can be reduced. For example, in a case of acquiring the difference after performing analog-digital conversion of each of the potential Vs2 of the second data signal and the potential Vs1 of the first data signal, the noise generated due to the analog-digital conversion is multiplied by $\sqrt{2}$. In other words, in this embodiment, as compared to the case of acquiring the difference after analog-digital conversion, the noise caused by analog-digital conversion is reduced by $1/\sqrt{2}$.

Further, by performing analog-digital conversion of the difference value between the potential Vs2 of the second data signal and the potential Vs1 of the first data signal, the power consumption of the photoelectric conversion apparatus 1000 can be reduced. The signal amplitude of the potential Vs2 of the second data signal is larger than the signal amplitude of the potential Vs1 of the first data signal. Therefore, for example, when performing analog-digital conversion of the difference between the potential Vs2 of the second data signal and the potential Vn of the reset signal, the voltage across the resistor element 240 becomes high, and the current input to the conversion circuit 60 becomes large. In this case, for example, the current value of the current source 300 needs to be increased, resulting in an increase in power consumption. On the other hand, in this embodiment, the difference between the potential Vs2 of the second data signal and the potential Vs1 of the first data signal is smaller than the difference between the potential Vs2 of the second data signal and the potential Vn of the reset signal. Hence, when reading out the difference value between the potential Vs2 of the second data signal and the potential Vs1 of the first data signal, the voltage across the resistor element 240 becomes low, and the current input to the conversion circuit 60 becomes small. Accordingly, the current value of the current source 300 can be decreased, so that the power consumption can be decreased in the photoelectric conversion apparatus 1000.

Furthermore, gains are applied to the potentials Vs1 and Vs2 of two data signals by using the common resistor element 240. Thus, the gain fluctuations of the potentials Vs1 and Vs2 of two data signals caused by temperature or process variation are likely to synchronize in the same direction. As a result, it is possible to suppress deterioration of the image quality of an HDR image caused by different variations superimposed on the signals corresponding to two different accumulation times.

Here, it has been described above that analog-digital conversion is performed after acquiring the difference value between two data signals obtained from one pixel 10 (photoelectric conversion element 400) among the plurality of pixels 10 (photoelectric conversion elements 400) arranged in the photoelectric conversion unit 5. However, the above-described operation is not limited to this. For example, the difference may be acquired for data signals read out from the photoelectric conversion elements 400 arranged in different pixels 10. The plurality of photoelectric conversion elements 400 can form a plurality of photoelectric conversion element groups each including two or more photoelectric conversion elements. The sample hold unit 50 samples, for each photoelectric conversion element group of the plurality of photoelectric conversion element groups, two or more data signals based on charges generated in accordance incident light in each of the plurality of photoelectric conversion element groups. The pixels 10 arranged with the photoelectric conversion elements 400 forming one photoelectric conversion element group for which the difference between data signals is acquired may be, for example, the pixels 10 adjacent to each other.

In the above description, the arrangement has been taken as an example in which two capacitive elements 120 and 123 are arranged in the sample hold circuit 210, and two capacitive elements 121 and 122 are arranged in the sample hold circuit 211. However, the present invention is not limited to this. For example, without arranging the capacitive elements 122 and 123, the capacitive element 120 and the capacitive element 121 may hold data signals read out from the photoelectric conversion elements 400 arranged in the pixels 10 adjacent to each other, and analog-digital conversion may be performed for the difference signal between the readout data signals. In this case, for example, an edge detection signal can be obtained. Even when the readout operation is performed in this manner, the noise caused by analog-digital conversion can be reduced by 1/√2 and the readout operation can be performed with low power, as has been described above. However, in this case, it is difficult to cancel the reset noise generated by the floating diffusion of the pixel 10. Therefore, acquiring the difference between signals transferred to the same floating diffusion can suppress the reset noise more.

Figure 6:
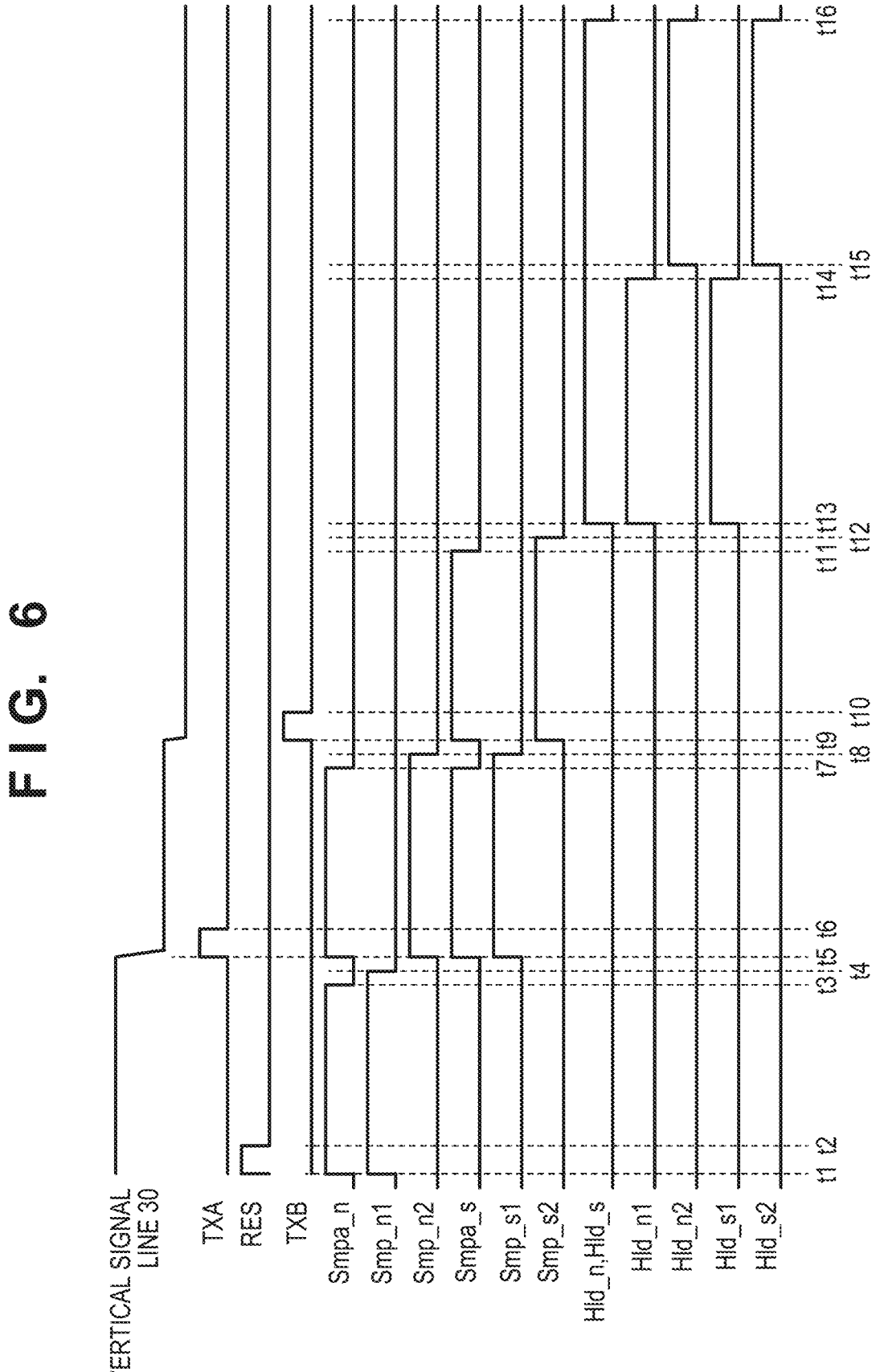
FIG. 6 is a timing chart showing an operation example of the photoelectric conversion apparatus shown in FIG. 1.

FIG. 5 is a view showing a modification of the pixel 10 shown in FIG. 2. FIG. 6 is a timing chart showing an operation example of the photoelectric conversion apparatus 1000 including the pixel 10 shown in FIG. 5. Points different from the contents described above with reference to FIGS. 1 to 4 will be mainly described below, and a description of the arrangement and operation that may be similar to those in the above description will be omitted, as appropriate.

As shown in FIG. 5, the pixel 10 further includes a photoelectric conversion element 401 and a transfer transistor 411, in addition to the arrangement shown in FIG. 2. In the arrangement shown in FIG. 5, the pixel 10 is a so-called floating diffusion sharing pixel in which the photoelectric conversion element 400 and the photoelectric conversion element 401 are connected to the node 420. In this arrangement, two photoelectric conversion elements 400 and 401 share the node 420 functioning as the floating diffusion. It can also be said that the pixel 10 shown in FIG. 5 is, for example, a pixel corresponding to two pixels in the vertical direction each including one photoelectric conversion element.

Here, the photoelectric conversion element 400 and the photoelectric conversion element 401 arranged in the pixel 10 share one node 420, and form a photoelectric conversion element group for which the difference between data signals is acquired as will be described later. The plurality of pixels 10 are arranged in the photoelectric conversion unit 5. Therefore, it can also be said that a plurality of photoelectric conversion element groups formed by the photoelectric conversion elements 400 and 401, and a plurality of floating diffusions respectively corresponding to the plurality of photoelectric conversion element groups are arranged in the photoelectric conversion unit 5.

For example, the photoelectric conversion element 401 can be a photodiode, like the photoelectric conversion element 400. The transfer transistor 411 can have an arrangement similar to that of the transfer transistor 410. One of two main electrodes of the photoelectric conversion element 401 is connected to the ground potential 450. The other of two main electrodes of the photoelectric conversion element 401 is connected to the node 420 via the transfer transistor 411. In place of the control signal TX described above, a control signal TXA is supplied to the gate electrode of the transfer transistor 410 to discriminate it from a control signal TXB supplied to the gate electrode of the transfer transistor 411. When the control signals TXA and TXB are supplied to the gate electrodes of the transfer transistors 410 and 411, and the transfer transistors 410 and 411 are turned on in accordance with the control signals TXA and TXB, signal charges accumulated in the photoelectric conversion elements 400 and 401 are transferred to the node 420.

Next, with reference to the timing chart shown in FIG. 6, parts of an operation example of the photoelectric conversion apparatus 1000 including the pixel 10 shown in FIG. 5, which are different from the above-described operation example shown in FIG. 4, will be mainly described. As in the example of FIG. 4, the operation of one photoelectric conversion element group (the pixel 10 and the photoelectric conversion elements 400 and 401) of interest will be described, but a similar operation can be performed in each photoelectric conversion element group (the pixel 10 and the photoelectric conversion elements 400 and 401) arranged in the photoelectric conversion unit 5. In that case, the operation illustrated in FIG. 6 can be simultaneously performed in the photoelectric conversion element group (the pixel 10 and the photoelectric conversion elements 400 and 401) arranged in the same row as the photoelectric conversion element group (the pixel 10 and the photoelectric conversion elements 400 and 401) of interest. Further, the similar operation can be sequentially performed for each row in the photoelectric conversion element group (the pixel 10 and the photoelectric conversion elements 400 and 401) arranged in the same column as the photoelectric conversion element group (the pixel 10 and the photoelectric conversion elements 400 and 401) of interest.

In the period from time t5 to time t6, the control signal TXA shown in FIG. 5 is set at high level and the transfer transistor 410 is turned on, so that charges are transferred from the photoelectric conversion element 400 to the node 420 serving as the floating diffusion. In the period from time t5 to time t8, as in the above description, the first data signal based on the charges of the photoelectric conversion element 400 is sampled and held by the capacitive element 121 of the sample hold circuit 211 and the capacitive element 123 of the sample hold circuit 210 shown in FIG. 3.

In the period from time t9 to time t10, the control signal TXB shown in FIG. 5 is set at high level and the transfer transistor 411 is turned on, so that charges are transferred from the photoelectric conversion element 401 to the node 420 serving as the floating diffusion. In the period from time t9 to time t12, the second data signal based on the charges of the photoelectric conversion element 400 and the photoelectric conversion element 401 is sampled and held by the capacitive element 122 of the sample hold circuit 211 shown in FIG. 3.

In this manner, in the sample hold unit 50, after the first transfer operation of transferring charges from the photoelectric conversion element 400 to the node 420 serving as the floating diffusion and before performing the second transfer operation of transferring charges from the photoelectric conversion element 401 to the node 420 without resetting the node 420 after the first transfer operation, the first data signal based on the charges transferred from the photoelectric conversion element 400 to the floating diffusion is sampled in the capacitive element 123 of the sample hold circuit 210 and the capacitive element 121 of the sample hold circuit 211. Further, in the sample hold unit 50, after the second transfer operation, the second data signal based on the charges transferred from the photoelectric conversion element 400 and the photoelectric conversion element 401 to the floating diffusion is sampled in the capacitive element 122 of the sample hold circuit 211. Furthermore, in the sample hold unit 50, as in the above description, when the node 420 functioning as the floating diffusion is reset, the reset signal corresponding to the voltage of the reset node 420 is sampled and held in the capacitive element 120 of the sample hold circuit 210.

After time t13, as in the above description, the conversion circuit 60 performs analog-digital conversion of the difference value between the potential Vs1 of the first data signal and the potential Vn of the reset signal. Further, the conversion circuit 60 performs analog-digital conversion of the difference value between the potential Vn2 of the second data signal and the potential Vs1 of the first data signal. With this, it is possible to obtain a digital signal based on the charges generated by each of the photoelectric conversion elements 400 and 401 in accordance with incident light. With the operations as described above, it is possible to read out signals from the photoelectric conversion elements 400 and 401 for two rows during a unit readout period for reading out a signal from one pixel 10, and the signal readout speed can be increased. Further, as in the operation illustrated in FIG. 4, since the analog-digital conversion of the difference signal (difference value) is performed after the differential processing of data signals, it is possible to read out the signal with low noise and low power.

In the arrangement shown in FIG. 5 and the operation illustrated in FIG. 6, a microlens corresponding to the photoelectric conversion element 400 and a microlens corresponding to the photoelectric conversion element 401 may be separately arranged. With this, it is possible to increase the speed of reading out data signals (to be also referred to as image signals) as has been described above. However, the present invention is not limited to this, and the photoelectric conversion element 400 and the photoelectric conversion element 401 may share a microlens. The photoelectric conversion elements 400 and 401 may be, for example, a pair of photodiodes formed below the same microlens, and the pixel 10 may form a phase difference detection pixel. In this case, with the above-described readout operation, it is possible to read out an auto focus (AF) signal with high speed, low noise, and low power.

For example, the photoelectric conversion element 400 and the photoelectric conversion element 401 may be different from each other in the sensitivity to incident light. For example, in order to change the sensitivity, the photoelectric conversion elements 400 and 401 may be photodiodes having different light incident areas. With this, the above-described HDR image capturing is possible.

The form of the photoelectric conversion apparatus 1000 is not limited to the form described above. For example, in the photoelectric conversion unit 5 that receives incident light, a plurality of vertical signal lines 30 may be arranged for one pixel column. In this case, a plurality of selection transistors 440 may be arranged in the pixel 10 to select, from the plurality of vertical signal lines 30 arranged in correspondence with one pixel column, the vertical signal line 30 to output a signal. Alternatively, for example, a part of pixels 10 arranged in one pixel column may be connected to one vertical signal line 30, and another part of pixels 10 arranged in the one pixel column may be connected to another vertical signal line 30. Alternatively, the photoelectric conversion apparatus 1000 may be formed without the sample hold circuits 210 and 211. In this case, a signal corresponding to the difference between signals respectively output to multiple vertical signal lines 30 may be input to the conversion circuit 60. The multiple vertical signal lines 30 to obtain the difference may be the plurality of vertical signal lines 30 arranged in correspondence with the pixels 10 in one column. In this case, it is possible to obtain a signal corresponding to the signal difference between the pixels 10 in a plurality of rows. Alternatively, the multiple vertical signal lines 30 to obtain the difference may be the vertical signal line 30 arranged in correspondence with the pixel 10 in the first column and the vertical signal line 30 arranged in correspondence with the pixel 10 in another second column. In this case, it is possible to obtain a signal corresponding to the signal difference between the pixels 10 in a plurality of columns. That is, two signals, which are signals respectively corresponding to signal charges generated by the photoelectric conversion unit 5 based on incident light, may be input to the resistor element 240 functioning as a differential circuit arranged between the vertical signal lines 30 different from each other.

As has been described above, in the photoelectric conversion apparatus 1000, the pixel substrate 1 and the circuit substrate 2 may be stacked. Further, in the arrangement shown in FIG. 1, the current source 40, the sample hold unit 50, the conversion circuit 60, the data processing circuit 90, and the output unit 100 are shown to be arranged on one circuit substrate 2. However, the present invention is not limited to this, and the components forming the circuit substrate 2 may be distributed and arranged on a plurality of substrates. For example, the circuit substrate 2 may be formed by stacking a substrate including the current source 40 and the sample hold unit 50 and a substrate including the conversion circuit 60, the data processing circuit 90, and the output unit 100. The circuit substrate 2 may be a stacked substrate including three or more layers on which the components are appropriately distributed and arranged. On the other hand, for example, the pixel substrate 1 and the circuit substrate 2 may be arranged on one substrate. They may be arranged, as appropriate, in accordance with specifications required for the photoelectric conversion apparatus 1000, and the like. The components of the photoelectric conversion apparatus 1000 may be distributed and arranged on three or more stacked substrates.

An application example of the photoelectric conversion apparatus 1000 according to the embodiment described above will be described below. FIG. 7 is a schematic view of electronic equipment EQP incorporating the photoelectric conversion apparatus 1000. FIG. 7 shows a camera as an example of the electronic equipment EQP. The concept of a camera here not only includes an apparatus whose main object is shooting, but also an apparatus (for example, a personal computer or a mobile terminal such as a smartphone) that has a shooting function auxiliary.

The photoelectric conversion apparatus 1000 can be a semiconductor chip with a stacked structure provided with the photoelectric conversion unit 5. As shown in FIG. 7, the photoelectric conversion apparatus 1000 is contained in a semiconductor package PKG. The semiconductor package PKG can include a base to which the photoelectric conversion apparatus 1000 is fixed, a lid such as glass facing the photoelectric conversion apparatus 1000, and a conductive connecting member such as a bonding wire or bump used to connect the terminal arranged in the base to a terminal arranged in the photoelectric conversion apparatus 1000. The equipment EQP may further include at least one of an optical system OPT, a control device CTRL, a processing device PRCS, a display device DSPL, and a storage device MMRY.

The optical system OPT is a system for forming an image on the photoelectric conversion apparatus 1000, and can be, for example, a lens, a shutter, and a mirror. The control device CTRL is a device for controlling the operation of the photoelectric conversion apparatus 1000, and can be, for example, a semiconductor device such as an ASIC or the like. The processing device PRCS processes the signal output from the photoelectric conversion apparatus 1000, and can be, for example, a semiconductor device such as a CPU, an ASIC, or the like. The display device DSPL can be an EL display device or a liquid crystal display device that displays image data obtained by the photoelectric conversion apparatus 1000. The storage device MMRY is a magnetic device or a semiconductor device for storing the image data obtained by the photoelectric conversion apparatus 1000. The storage device MMRY can be a volatile memory such as an SRAM, a DRAM, or the like or a nonvolatile memory such as a flash memory or a hard disk drive. A mechanical device MCHN includes a moving or propulsion unit such as a motor or an engine. The mechanical device MCHN in the camera can drive the components of the optical system OPT for zooming, focusing, and shutter operations. In the equipment EQP, image data output from the photoelectric conversion apparatus 1000 is displayed on the display device DSPL, or transmitted to an external device by a communication device (not shown) included in the equipment EQP. Hence, the equipment EQP may also include the storage device MMRY and the processing device PRCS.

The camera incorporating the photoelectric conversion apparatus 1000 is also applicable as a surveillance camera or an onboard camera mounted in transportation equipment such as an automobile, a railroad car, a ship, an airplane, or an industrial robot. In addition, the camera incorporating the photoelectric conversion apparatus 1000 is not limited to transportation equipment but is also applicable to equipment that widely uses object recognition, such as an intelligent transportation system (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-088073, filed May 29, 2023, which is hereby incorporated by reference herein in its entirety.

What is claimed is:

1. A photoelectric conversion apparatus comprising:
a photoelectric conversion unit configured to receive incident light;
a differential circuit configured to receive a first signal and a second signal, which are signals respectively corresponding to signal charges generated by the photoelectric conversion unit based on the incident light, and output a third signal indicating a difference between the first signal and the second signal; and
an oversampling conversion circuit configured to perform analog-digital conversion of the third signal,
wherein a plurality of photoelectric conversion elements are arranged in the photoelectric conversion unit,
the first signal is a signal based on charges generated in accordance with incident light in a part of photoelectric conversion elements of the plurality of photoelectric conversion elements, and
the second signal is a signal based on charges generated in accordance with incident light in another part of photoelectric conversion elements of the plurality of photoelectric conversion elements.

2. The apparatus according to claim 1, further comprising a sample hold unit configured to receive the first signal and the second signal and hold the first signal and the second signal,
wherein an output node of the sample hold unit is electrically connected to the differential circuit,

a plurality of floating diffusions are further arranged in the photoelectric conversion unit so as to correspond to the plurality of photoelectric conversion elements, respectively, and in the sample hold unit:
after a first transfer operation of transferring charges from a first photoelectric conversion element of interest among the plurality of photoelectric conversion elements to a first floating diffusion corresponding to the first photoelectric conversion element among the plurality of floating diffusions and before performing a second transfer operation of transferring charges from the first photoelectric conversion element to the first floating diffusion without resetting the first floating diffusion after the first transfer operation, the first signal based on charges transferred to the first floating diffusion is sampled, and
after the second transfer operation, the second signal based on charges transferred to the first floating diffusion is sampled.

3. The apparatus according to claim 2, wherein the sample hold unit samples a fourth signal when the first floating diffusion is reset, and
the oversampling conversion circuit further performs analog-digital conversion of a fifth signal indicating a difference between the first signal and the fourth signal and output by the differential circuit.

4. The apparatus according to claim 3, wherein the sample hold unit comprises: a first sample hold circuit including a first capacitive element, a second capacitive element, and an output amplifier shared by the first capacitive element and the second capacitive element; and a second sample hold circuit including a third capacitive element, a fourth capacitive element, and an output amplifier shared by the third capacitive element and the fourth capacitive element,
the first signal is held by the first capacitive element and the third capacitive element,
the second signal is held by the fourth capacitive element,
the fourth signal is held by the second capacitive element, and
the differential circuit generates the third signal from the first signal held by the first capacitive element and the second signal held by the fourth capacitive element.

5. The apparatus according to claim 4, wherein the differential circuit generates the fifth signal from the first signal held by the third capacitive element and the fourth signal held by the second capacitive element.

6. The apparatus according to claim 1, wherein the differential circuit generates, as the third signal, a current corresponding to a signal voltage difference between the first signal and the second signal.

7. The apparatus according to claim 1, wherein the oversampling conversion circuit includes a 42 analog-digital conversion circuit.

8. Electronic equipment comprising:
the photoelectric conversion apparatus according to claim 1; and
a control device configured to control an operation of the photoelectric conversion apparatus.

9. A photoelectric conversion apparatus comprising:
a photoelectric conversion unit configured to receive incident light;
a differential circuit configured to receive a first signal and a second signal, which are signals respectively corresponding to signal charges generated by the photoelectric conversion unit based on the incident light, and output a third signal indicating a difference between the first signal and the second signal; and an oversampling conversion circuit configured to perform analog-digital conversion of the third signal, wherein a plurality of photoelectric conversion elements are arranged in the photoelectric conversion unit, the plurality of photoelectric conversion elements form a plurality of photoelectric conversion element groups each including not less than two photoelectric conversion elements, the first signal is a signal based on charges generated in accordance with incident light in a part of photoelectric conversion element groups of the plurality of photoelectric conversion element groups, and the second signal is a signal based on charges generated in accordance with incident light in another part of photoelectric conversion element groups of the plurality of photoelectric conversion element groups.

10. The apparatus according to claim 9, wherein each of the plurality of photoelectric conversion element groups includes a first photoelectric conversion element and a second photoelectric conversion element, the first signal is a signal based on charges generated in accordance with incident light in the first photoelectric conversion element, and the second signal is a signal based on charges generated in accordance with incident light in the first photoelectric conversion element and charges generated in accordance with incident light in the second photoelectric conversion element.

11. The apparatus according to claim 10, further comprising a sample hold unit configured to receive the first signal and the second signal and hold the first signal and the second signal, wherein an output node of the sample hold unit is electrically connected to the differential circuit, a plurality of floating diffusions are further arranged in the photoelectric conversion unit so as to correspond to the plurality of photoelectric conversion element groups, respectively, and in the sample hold unit:

after a first transfer operation of transferring charges from the first photoelectric conversion element of a photoelectric conversion element group of interest among the plurality of photoelectric conversion element groups to a first floating diffusion corresponding to the photoelectric conversion element group of interest among the plurality of floating diffusions and before performing a second transfer operation of transferring charges from the second photoelectric conversion element to the first floating diffusion without resetting the first floating diffusion after the first transfer operation, the first signal based on charges transferred to the first floating diffusion is sampled, and after the second transfer operation, the second signal based on charges transferred to the first floating diffusion is sampled.

12. The apparatus according to claim 11, wherein the first photoelectric conversion element and the second photoelectric conversion element share a microlens.

13. The apparatus according to claim 11, wherein the first photoelectric conversion element and the second photoelectric conversion element are different from each other in a sensitivity to incident light.

14. The apparatus according to claim 11, wherein the sample hold unit samples a fourth signal when the first floating diffusion is reset, and the oversampling conversion circuit further performs analog-digital conversion of a fifth signal indicating a difference between the first signal and the fourth signal and output by the differential circuit.

15. The apparatus according to claim 14, wherein the sample hold unit comprises: a first sample hold circuit including a first capacitive element, a second capacitive element, and an output amplifier shared by the first capacitive element and the second capacitive element; and a second sample hold circuit including a third capacitive element, a fourth capacitive element, and an output amplifier shared by the third capacitive element and the fourth capacitive element, the first signal is held by the first capacitive element and the third capacitive element, the second signal is held by the fourth capacitive element, the fourth signal is held by the second capacitive element, and the differential circuit generates the third signal from the first signal held by the first capacitive element and the second signal held by the fourth capacitive element.

16. The apparatus according to claim 15, wherein the differential circuit generates the fifth signal from the first signal held by the third capacitive element and the fourth signal held by the second capacitive element.

17. The apparatus according to claim 9, wherein the differential circuit generates, as the third signal, a current corresponding to a signal voltage difference between the first signal and the second signal.

18. The apparatus according to claim 9, wherein the oversampling conversion circuit includes a 42 analog-digital conversion circuit.

19. Electronic equipment comprising:

the photoelectric conversion apparatus according to claim 4; and a control device configured to control an operation of the photoelectric conversion apparatus.

20. A substrate stacked on a substrate provided with a photoelectric conversion unit configured to receive incident light, the substrate comprising:

a differential circuit configured to receive a first signal and a second signal, which are signals respectively corresponding to signal charges generated by the photoelectric conversion unit based on the incident light, and output a third signal indicating a difference between the first signal and the second signal; and an oversampling conversion circuit configured to perform analog-digital conversion of the third signal, wherein a plurality of photoelectric conversion elements are arranged in the photoelectric conversion unit, the first signal is a signal based on charges generated in accordance with incident light in a part of photoelectric conversion elements of the plurality of photoelectric conversion elements, and the second signal is a signal based on charges generated in accordance with incident light in another part of photoelectric conversion elements of the plurality of photoelectric conversion elements.

* * * * *